United States Patent
Choi et al.

(10) Patent No.: US 10,501,069 B2
(45) Date of Patent: Dec. 10, 2019

(54) METHOD OF CONTROLLING TRANSMISSION FOR REDUCING CLUTCH ABRASION AND AUTOMATIC TRANSMISSION CONTROLLED BY METHOD

(71) Applicant: HYUNDAI AUTRON CO., LTD., Seoul (KR)

(72) Inventors: Jongik Choi, Anyang-si (KR); Jun Hyung Kim, Anyang-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 0 days.

(21) Appl. No.: 16/179,658

(22) Filed: Nov. 2, 2018

(65) Prior Publication Data

US 2019/0184969 A1  Jun. 20, 2019

(30) Foreign Application Priority Data

Dec. 14, 2017 (KR) .......................... 10-2017-0172232

(51) Int. Cl.
*B60W 20/10* (2016.01)
*B60W 10/30* (2006.01)
(Continued)

(52) U.S. Cl.
CPC ............... *B60W 20/10* (2013.01); *B60K 6/26* (2013.01); *B60K 6/387* (2013.01); *B60W 10/02* (2013.01);
(Continued)

(58) Field of Classification Search
CPC .... B60K 6/26; B60K 6/387; B60K 2006/268; B60W 10/02; B60W 10/06; B60W 10/08;
(Continued)

(56) References Cited

U.S. PATENT DOCUMENTS 8,747,074 B2 * 6/2014 Jeong ....................... B60K 6/48
417/16
8,886,374 B2 * 11/2014 Kim ........................ B60K 6/48
701/22

(Continued)

FOREIGN PATENT DOCUMENTS

KR    10-0569318 B1    4/2006
KR    10-0831435 B1    5/2008
(Continued)

*Primary Examiner* — Rachid Bendidi
(74) *Attorney, Agent, or Firm* — Morgan, Lewis & Bockius LLP

(57) ABSTRACT

Disclosed are a method of controlling a transmission for reducing clutch abrasion and an automatic transmission controlled by the method. The method is applied to a hybrid vehicle, and controls an automatic transmission having an independent flow control valve and an engine clutch cooling channel for the cooling of an engine clutch mounted thereon. The method includes a hybrid starter generator (HSG) state determination step of determining a state of an HSG, a driving motor cranking execution step of cranking an engine using a driving motor when the state of the HSG is a state in which the HSG does not operate in the HSG state determination step, and a cooling execution step of supplying an additional flow to the engine clutch cooling channel by driving the independent flow control valve, wherein the cooling execution step is performed simultaneously with the driving motor cranking execution step.

11 Claims, 4 Drawing Sheets

(51) Int. Cl.
*B60W 10/08* (2006.01)
*B60W 10/06* (2006.01)
*B60W 20/40* (2016.01)
*B60K 6/26* (2007.10)
*B60K 6/387* (2007.10)
*B60W 10/02* (2006.01)

(52) U.S. Cl.
CPC ............ *B60W 10/06* (2013.01); *B60W 10/08* (2013.01); *B60W 10/30* (2013.01); *B60W 20/40* (2013.01); *B60K 2006/268* (2013.01); *B60W 2710/021* (2013.01); *B60W 2710/029* (2013.01); *B60W 2710/30* (2013.01); *B60Y 2200/92* (2013.01); *B60Y 2300/428* (2013.01); *B60Y 2300/63* (2013.01)

(58) Field of Classification Search
CPC ...... B60W 10/30; B60W 20/10; B60W 20/40; B60W 2710/021; B60W 2710/029; B60W 2710/30; B60Y 2200/92; B60Y 2300/428; B60Y 2300/63

See application file for complete search history.

(56) References Cited

U.S. PATENT DOCUMENTS

| | | | |
|---|---|---|---|
| 9,074,570 B2* | 7/2015 | Kim | .................... F02N 11/0803 |
| 9,109,692 B2* | 8/2015 | Jeong | ....................... B60K 6/48 |
| 9,162,683 B2* | 10/2015 | Kim | ...................... F02N 11/108 |
| 10,012,308 B2* | 7/2018 | Song | ................... F16H 61/0025 |

FOREIGN PATENT DOCUMENTS

| | | |
|---|---|---|
| KR | 10-2009-0098318 A | 9/2009 |
| KR | 10-2012-0063258 A | 6/2012 |
| KR | 10-2014-0147357 A | 12/2014 |
| KR | 10-2017-0042386 A | 4/2017 |
| KR | 10-2017-0071000 A | 6/2017 |

\* cited by examiner

METHOD OF CONTROLLING TRANSMISSION FOR REDUCING CLUTCH ABRASION AND AUTOMATIC TRANSMISSION CONTROLLED BY METHOD

CROSS REFERENCE TO RELATED APPLICATION

The present application claims the benefit of Korean Patent Application No. 10-2017-0172232 filed in the Korean Intellectual Property Office on Dec. 14, 2017, the entire contents of which are incorporated herein by reference.

BACKGROUND OF THE INVENTION

1. Technical Field

The present invention relates to a method of controlling a transmission and an automatic transmission controlled by the method and, more particularly, to a method of controlling a transmission, which can reduce the abrasion of an engine clutch in performing cranking by a driving motor when a hybrid starter generator (HSG) cannot operate normally, and an automatic transmission controlled by the method.

2. Description of the Related Art

In general, the transmission of a vehicle is an apparatus positioned between a clutch and a trust shaft to increase or decrease rotatory power of an engine in response to a change in the driving state of the vehicle and to enable the backward driving of the vehicle. The transmission is basically divided into a manual transmission having a transmission step number directly controlled by a driver and an automatic transmission having a transmission step number automatically controlled by a controller, such as a transmission control unit (TCU).

The automatic transmission includes a brake for controlling the operation of a plurality of clutches and epicyclic gear unit embedded in a housing for a clutch manipulation and a transmission manipulation, a hydraulic control apparatus for controlling abrasion factors using oil pressure, and a one-way clutch for improving a feeling of transmission, such as suppressing a torque change during transmission and reducing a transmission time.

In the brake, multiple gears of a gearing state are always arranged to receive the output of the engine from a torque converter and to convert the received output into a proper rotation speed and torque. In order to obtain a given RPM ratio through the gears, the gears are selectively driven by abrasion factors, such as the clutch and the brake.

Furthermore, in the hydraulic control apparatus, in order to drive the corresponding abrasion factors in response to transmission, multiple transmission valves for adjusting a flow of a working fluid are configured in a valve body. Accordingly, the abrasion factors are selectively driven by supplying the working fluid to the abrasion factors through the multiple valves controlled by the TCU in which shifting patterns according to multiple driving states of the vehicle have been previously stored. Accordingly, the abrasion factors enable the epicyclic gear unit to convert the driving force of the engine into a corresponding RPM ratio and torque and output them.

A representative example of the automatic transmission according to a conventional technology is shown in FIG. 1.

As may be seen from FIG. 1, the automatic transmission according to the conventional technology may be an element, including an epicyclic gear unit 5, a counter shaft 4, a one-way clutch 10, a gear teeth C'', an outer race 11, an inner race 12, a wave spring 20, a primary transmission step part A, a secondary transmission step part B, and a casing C'.

The automatic transmission 10 including such elements according to the conventional technology prevents an impact between the transmission casing and the teeth of the outer race when the engine is cranked again after stopped. Accordingly, there are effects in that a transmission impact is reduced and the durability of the transmission is improved because the damage and abrasion of the transmission casing and the gear teeth are prevented.

A hybrid vehicle (i.e., transmission-mounted electric device) according to a conventional technology can be driven by the driving force of the engine+motor through the conjunction of the engine clutch after the engine is cranked except for a case where the engine is cranked for charging. The cranking of the engine is performed by a hybrid starter generator (HSG), but may be performed by the driving motor when the HSG does not drive.

In accordance with the conventional technology, when the HSG fails, a physical N step is maintained in order to crank the engine, and the engine is then cranked by the driving motor.

If engine cranking is attempted in the state in which a required torque is high (e.g., rapid acceleration condition), abrasion occurs because an excessive load is applied to the abrasion surface of the engine clutch.

In order to solve the problem, a control method of joining the engine clutch by the driving motor right before cranking and then operating in the engine clutch limp-home state, that is, the state in which the engine clutch has been joined, is used.

However, such a method has a problem in that abrasion occurs because an excessive load is applied to the engine clutch.

Accordingly, there is a need for a technology capable of solving the problems of the conventional technology.

PRIOR ART DOCUMENT

[Patent Document]
(Patent Document 0001) Korean Patent No. 10-0569318 (Apr. 3, 2006)

SUMMARY OF THE INVENTION

An object of the present invention is to provide a method of controlling a transmission, which can reduce the abrasion of an engine clutch in performing cranking by a driving motor when a hybrid starter generator (HSG) cannot operate normally, and an automatic transmission controlled by the method.

A method of controlling an automatic transmission is applied to a hybrid vehicle and is a method of controlling an automatic transmission on which an independent flow control valve and an engine clutch cooling channel for the cooling of an engine clutch have been mounted on. The method includes a hybrid starter generator (HSG) state determination step of determining a state of an HSG, a driving motor cranking execution step of cranking an engine using a driving motor when the state of the HSG is a state in which the HSG does not operate in the HSG state determination step, and a cooling execution step of supplying an additional flow to the engine clutch cooling channel by driving the independent flow control valve, wherein the cooling execution step is performed simultaneously with the driving motor cranking execution step.

In one embodiment of the present invention, the driving motor cranking execution step may be performed when the engine cannot be cranked by the HSG.

In one embodiment of the present invention, the method may further include an HSG cranking execution step of cranking the engine by the HSG when the state of the HSG is a normal state in the HSG state determination step.

In one embodiment of the present invention, the method may further include a power increase cranking determination step of determining whether the engine is cranked due to an increase in power required by a driver and a power reduction stop determination step of determining whether the engine is stopped due to a reduction in power required by a driver.

In this case, in the case of the engine cranking state attributable to an increase in power required by a driver, an operation of an electric oil pump (EOP) may be controlled by a peak RPM control method of suddenly increasing an operating RPM for a specific time.

Furthermore, in the case of the engine cranking state attributable to an increase in power required by a driver, an operation of an electric oil pump (EOP) may be controlled by an RPM control method based on a required EOP flow value calculated by multiplying the sum of a transmission oil flow and a flow capable of reducing the abrasion of the engine clutch by a safety coefficient.

Furthermore, in the case of the engine cranking state attributable to an increase in power required by a driver, when a difference value between a command RPM value delivered to an electric oil pump (EOP) and an actual driving RPM value of the EOP is smaller than a preset reference value, the independent flow control valve may be open and the cooling execution step may be performed.

In this case, when an open time of the independent flow control valve exceeds the preset reference value, oil pressure may be provided to the engine clutch.

In one embodiment of the present invention, in the case of the engine cranking state attributable to an increase in power required by a driver, when a difference value between a command RPM value delivered to an electric oil pump (EOP) and an actual driving RPM value of the EOP is greater than or equal to a preset reference value, the independent flow control valve may be blocked.

In this case, oil pressure may be provided to the engine clutch after the independent flow control valve may be blocked. The existing command RPM value may be transmitted to the EOP.

In one embodiment of the present invention, in the case of the engine stop state attributable to a reduction in power required by a driver, after the independent flow control valve is blocked, oil pressure may be provided to the engine clutch and an existing command RPM value may be transmitted to an electric oil pump (EOP).

Furthermore, an embodiment of the present invention may provide a transmission controlled by the method of controlling a transmission. An automatic transmission according to an aspect of the present invention is applied to a hybrid vehicle and includes an independent flow control valve and an engine clutch cooling channel for the cooling of an engine clutch. The automatic transmission may includes a detector configured to detect whether a hybrid starter generator (HSG) operates normally and to transmit the detected data to a controller, the controller configured to crank an engine using a driving motor based on the detected data from the detector and to simultaneously control the independent flow control valve to supply an additional flow to the engine clutch cooling channel by driving the independent flow control valve, and memory configured to store the detected data from the detector and to store a given program code for controlling an overall operation of the automatic transmission controlled by a transmission control method and data input and output when an operation based on the program code may be performed.

DESCRIPTION OF REFERENCE NUMERALS

Figure 1:
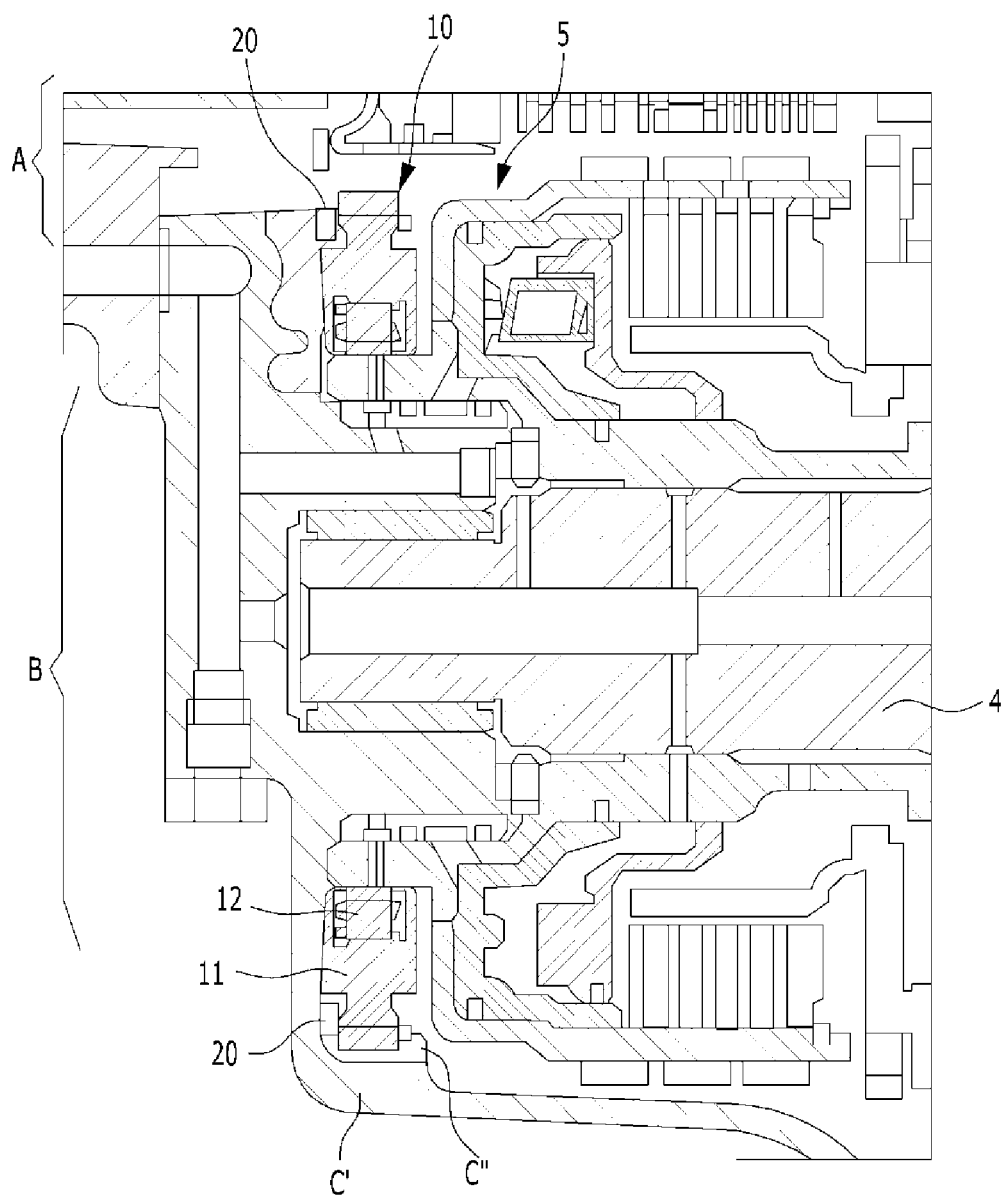
FIG. 1 is a cross-sectional view showing a clutch including anti-abrasion means according to a conventional technology.

10: automatic transmission
101: engine clutch
102: independent flow control valve
103: engine clutch cooling channel
104: driving motor
110: detector
120: controller
130: memory
S100: method of controlling transmission
S110: HSG state determination step
S115: power increase cranking determination step
S116: power reduction stop determination step
S120: driving motor cranking execution step
S130: cooling execution step
S140: HSG cranking execution step

DETAILED DESCRIPTION

Hereinafter, embodiments of the present invention are described in detail with reference to the accompanying drawings. Terms or words used in the specification and claims should not be construed as having common or dictionary meanings, but should be construed as having meanings and concepts that comply with the technical spirit of the present invention.

In the entire specification, when it is described that one member is positioned "on" or "over" the other member, it means that one member may adjoin the other member and a third member may be interposed between the two members. In the entire specification, unless explicitly described to the contrary, the word "include, have, or comprise" will be understood to imply the inclusion of stated elements but not the exclusion of any other elements.

Figure 2:
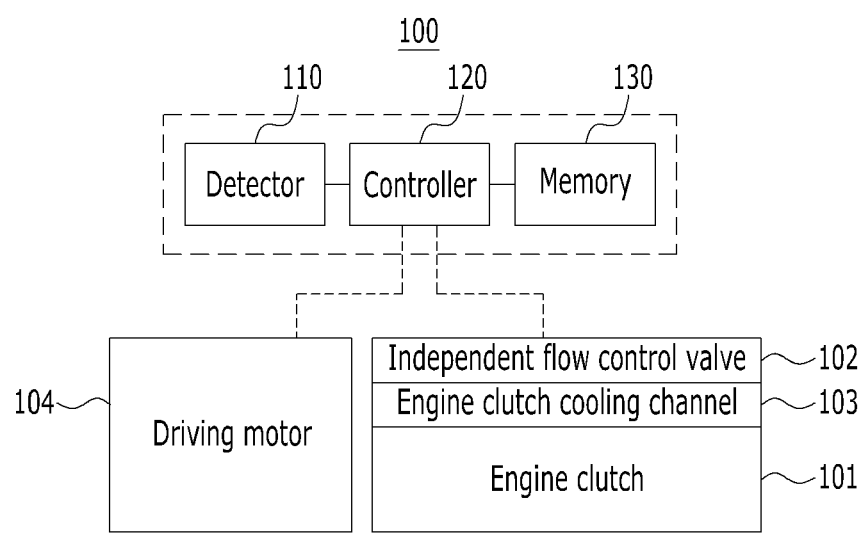
FIG. 2 shows the configuration of an automatic transmission according to an embodiment of the present invention.
Figure 3:
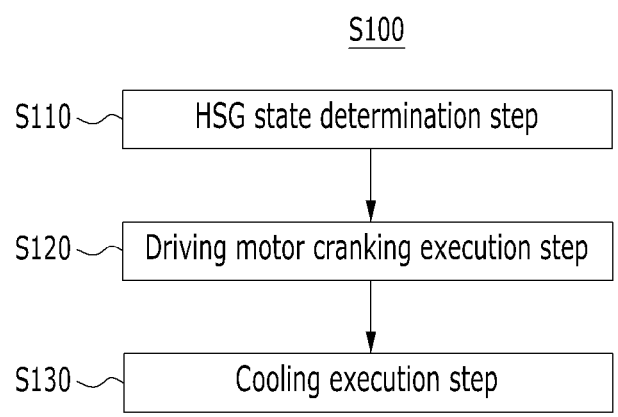
FIG. 3 is a flowchart showing a method of controlling a transmission according to an embodiment of the present invention.

FIG. 2 shows the configuration of an automatic transmission according to an embodiment of the present invention. FIG. 3 is a flowchart showing a method of controlling a transmission according to an embodiment of the present invention.

Referring to FIGS. 2 and 3, the method S100 of controlling a transmission according to the present embodiment is a method of controlling an automatic transmission 100, which is applied to a hybrid vehicle and on which an independent flow control valve 102 and the engine clutch cooling channel 103 for the cooling of an engine clutch 101 have been mounted.

As shown in FIG. 3, the method S100 of controlling a transmission according to the present embodiment includes an HSG state determination step S110, a driving motor cranking execution step S120 and a cooling execution step S130 including a specific element. Accordingly, the method can provide a transmission control method capable of reducing the abrasion of the engine clutch in performing cranking by a driving motor when an HSG cannot operate normally.

Hereinafter, elements configuring the method S100 of controlling a transmission according to the present embodiment are described in detail with reference to the accompanying drawings.

Figure 4:
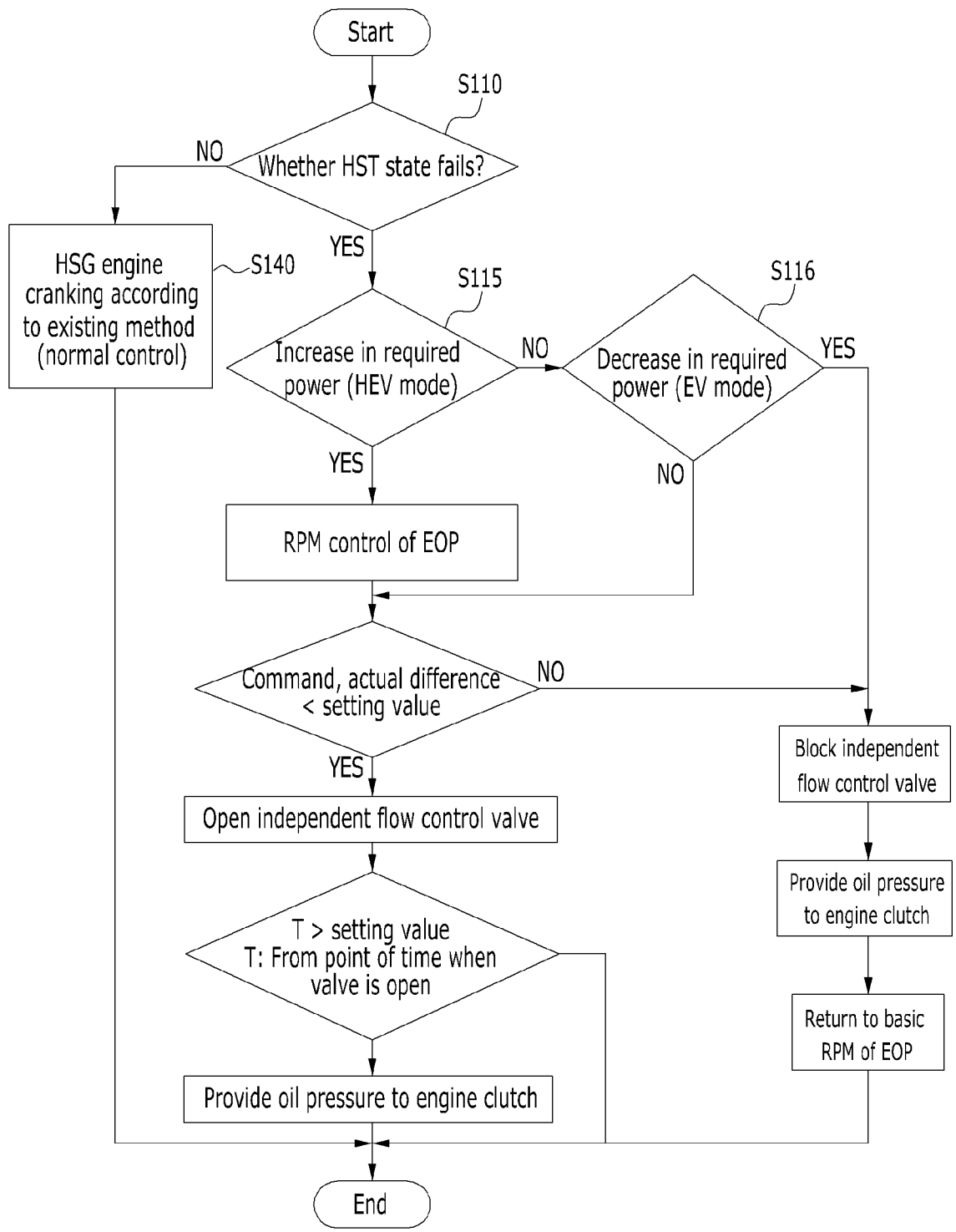
FIG. 4 is a flowchart showing a method of controlling a transmission according to an embodiment of the present invention.

FIG. 4 is a flowchart showing a method of controlling a transmission according to an embodiment of the present invention.

Referring to FIG. 4 along with FIGS. 2 and 3, in the HSG state determination step S110 according to the present embodiment, the state of a hybrid starter generator (HSG) is determined.

After the HSG state determination step S110 is performed, as shown in FIG. 4, a power increase cranking determination step S115 and/or a power reduction stop determination step S116 may be performed.

Specifically, the power increase cranking determination step S115 is the step of determining whether an engine is cranked due to an increase in power required by a driver. Furthermore, the power reduction stop determination step S116 is the step of determining whether the engine is stopped due to a reduction in power required by a driver.

Accordingly, in accordance with the present embodiment, a control operation optimized for an operating condition of the transmission can be performed by controlling the operation of an electric oil pump (EOP) depending on the power increase cranking determination step of determining whether the engine is cranked due to an increase in power required by a driver or the power reduction stop determination step of determining whether the engine is stopped due to a reduction in power required by a driver. Accordingly, the operation of the EOP having improved responsiveness can be implemented. As a result, the abrasion of the engine clutch can be significantly reduced because an additional flow can be provided to the cooling channel of the engine clutch rapidly.

In this case, in the case of the engine cranking state attributable to an increase in power required by a driver, the operation of the EOP may be controlled by a peak RPM control method of suddenly increasing an operating RPM for a specific time. Furthermore, the operation of the EOP may be controlled by an RPM control method based on a required EOP flow value calculated by multiplying the sum of a transmission oil flow and a flow capable of reducing the abrasion of the engine clutch by a safety coefficient.

Furthermore, in the case of the engine cranking state attributable to an increase in power required by a driver, when a difference value between a command RPM value delivered to the EOP and an actual driving RPM value of the EOP is smaller than a preset reference value, the independent flow control valve 102 may be open and the cooling execution step may be performed, as shown in FIG. 4. In this case, when the open time of the independent flow control valve exceeds a preset reference value, oil pressure may be provided to the engine clutch 101.

In contrast, in the case of the engine cranking state attributable to an increase in power required by a driver, when a difference value between a command RPM value delivered to the EOP and an actual driving RPM value of the EOP is greater than or equal to a preset reference value, the independent flow control valve 102 may be blocked. In this case, after the independent flow control valve 102 is blocked, oil pressure may be provided to the engine clutch 101 and the existing command RPM value may be delivered to the EOP.

In the case of the engine stop state attributable to a reduction in power required by a driver, after the independent flow control valve 102 is blocked, oil pressure may be provided to the engine clutch 101 and the existing command RPM value may be delivered to the EOP.

As described above, the method S100 of controlling a transmission includes the HSG state determination step S110, the driving motor cranking execution step S120, and the cooling execution step S130 including specific elements. Accordingly, the method may provide a transmission control method a capable of reducing the abrasion of the engine clutch in performing cranking by a driving motor 104 when the HSG cannot operate normally.

Furthermore, an embodiment of the present invention may provide the automatic transmission 100 controlled by the method S100 of controlling a transmission. The automatic transmission 100 according to the present embodiment has a structure applied to a hybrid vehicle and configured to include the independent flow control valve 102 and the engine clutch cooling channel 103 for the cooling of the engine clutch 101.

Specifically, as shown in FIG. 2, the automatic transmission 100 according to the present embodiment includes a detector 1100, a controller 120 and memory 130, thereby being capable of reducing the abrasion of the engine clutch and achieving a load reduction effect in an abrasion surface. Accordingly, regenerative breaking energy recovery efficiency can be significantly improved although the cranking and stop of the engine are repeated while a vehicle operates.

Specifically, the detector 110 according to the present embodiment detects whether the HSG operates normally and transmits the detected data to the controller 120.

The controller 120 cranks the engine using the driving motor 104 based on the detected data from the detector 110, and may simultaneously control the independent flow control valve 102 to supply an additional flow to the engine clutch cooling channel 103 by driving the independent flow control valve 102.

Furthermore, the memory 130 according to the present embodiment stores detected data received from the detector 110, and stores a given program code for controlling an overall operation of the automatic transmission controlled by the method of controlling a transmission and data input and output when an operation based on the program code is performed.

The memory 130 according to the present embodiment is a generic term of a space or storage region in which data, etc. are stored. The memory may have a form of electrically erasable and programmable read only memory (EEPROM), flash memory (FM), and a hard disk drive.

The method S100 of controlling a transmission according to an embodiment of the present invention may be produced in the form of a program to be executed in a computer and stored in a computer-readable recording medium. Examples of the computer-readable recording medium include ROM, RAM, CD-ROM, a magnetic tape, a floppy disk, and an optical data storage device, and also include a thing implemented in the form of carrier waves (e.g., transmission through the Internet).

The computer-readable recording medium may be distributed to computer systems connected over a network, and computer-readable codes may be stored and executed in a distributed manner. Furthermore, a functional program, code and code segments for implementing the aforementioned method may be easily inferred by programmers of a technical field to which an embodiment belongs.

As described above, the method of controlling a transmission according to the embodiment of the present invention includes the HSG state determination step, the driving motor cranking execution step and the cooling execution step including specific elements. Accordingly, the method can provide a transmission control method capable of reducing the abrasion of the engine clutch in performing cranking by the driving motor when the HSG cannot operate normally.

Furthermore, in accordance with the method of controlling a transmission according to the embodiment of the present invention, a control operation optimized for an operating condition of the transmission can be performed by controlling the operation of the EOP depending on the power increase cranking determination step of determining whether the engine is cranked due to an increase in power required by a driver or the power reduction stop determination step of determining whether the engine is stopped due to a reduction in power required by a driver. Accordingly, the operation of the EOP having improved responsiveness can be implemented. As a result, the abrasion of the engine clutch can be significantly reduced because an additional flow can be provided to the cooling channel of the engine clutch rapidly.

Furthermore, in accordance with the automatic transmission controlled by the method of controlling a transmission according to the embodiment of the present invention, when the HSG cannot operate normally, cranking is performed by the driving motor and an additional flow is simultaneously supplied to the cooling channel mounted on the engine clutch. Accordingly, the abrasion of the engine clutch can be reduced and a load reduction effect in an abrasion surface can be achieved. As a result, regenerative breaking energy recovery efficiency can be significantly improved although the cranking and stop of the engine are repeated while a vehicle operates.

In the detailed description of the present invention, only some special embodiments of the present invention have been described. It is however to be understood that the present invention is not limited to the special embodiments described in the detailed description, but should be construed as including all of changes, equivalents and substitutes without departing from the spirit and range of the present invention defined by the appended claims.

That is, the present invention is not limited to the above-described specific embodiments and description and may be modified in various ways by a person having ordinary skill in the art to which the present invention pertains without departing from the gist of the present invention written in the claims. Such modifications or changes fall in the range of protection of the present invention.

What is claimed is:

1. A method for controlling an automatic transmission of a hybrid vehicle, wherein an independent flow control valve for controlling a flow of fluid and an engine clutch cooling channel for cooling of an engine clutch have been mounted on the automatic transmission, the method comprising:

a hybrid starter generator (HSG) state determination step of determining, by a controller of the automatic transmission, a state of the HSG;

a power increase cranking determination step of determining, by the controller of the automatic transmission, when the engine is cranked due to an increase in power required by a driver, in a case that the state of the HSG is a state in which the HSG does not operate in the HSG state determination step;

a power reduction stop determination step of determining, by the controller of the automatic transmission, when the engine is stopped due to a reduction in power required by the driver, in the case that the state of the HSG is the state in which the HSG does not operate in the HSG state determination step;

a driving motor cranking execution step of cranking, by the controller of the automatic transmission, an engine using a driving motor in the case that the state of the HSG is the state in which the HSG does not operate in the HSG state determination step;

a cooling execution step of supplying, by the controller of the automatic transmission, an additional flow of the fluid to the engine clutch cooling channel by controlling the independent flow control valve, wherein the cooling execution step is performed simultaneously with the driving motor cranking execution step.

2. The method of claim 1, wherein the driving motor cranking execution step is performed when the engine cannot be cranked by the HSG.

3. The method of claim 1, further comprising an HSG cranking execution step of cranking the engine by the HSG when the state of the HSG is a normal state in the HSG state determination step.

4. The method of claim 1, wherein in a case of the engine cranking state attributable to the increase in the power required by the driver, an operation of an electric oil pump (EOP) is controlled by a peak RPM control step of increasing an operating RPM for a specific time.

5. The method of claim 1, wherein in a case of the engine cranking state attributable to the increase in the power required by the driver, an operation of an electric oil pump (EOP) is controlled by an RPM control step based on a required EOP flow value calculated by multiplying a sum of a transmission oil flow and a flow capable of reducing an abrasion of the engine clutch by a safety coefficient.

6. The method of claim 1, wherein in a case of the engine cranking state attributable to the increase in the power required by the driver, when a difference value between a command RPM value delivered to an electric oil pump (EOP) and an actual driving RPM value of the EOP is smaller than a preset reference value, the independent flow control valve is open and the cooling execution step is performed.

7. The method of claim 6, wherein when an open time of the independent flow control valve exceeds the preset reference value, oil pressure is provided to the engine clutch.

8. The method of claim 1, wherein in a case of the engine cranking state attributable to the increase in the power required by the driver, when a difference value between a command RPM value delivered to an electric oil pump (EOP) and an actual driving RPM value of the EOP is greater than or equal to a preset reference value, the independent flow control valve is blocked.

9. The method of claim 8, wherein:

oil pressure is provided to the engine clutch after the independent flow control valve is blocked, and an existing command RPM value is transmitted to the EOP.

10. The method of claim 1, wherein in a case of the engine stop state attributable to the reduction in the power required by the driver, after the independent flow control valve is blocked, oil pressure is provided to the engine clutch and an existing command RPM value is transmitted to an electric oil pump (EOP).

11. An automatic transmission of a hybrid vehicle including an independent flow control valve for controlling a flow of fluid and an engine clutch cooling channel for a cooling of an engine clutch, the automatic transmission comprising:
   a detector configured to detect whether a hybrid starter generator (HSG) operates normally and to transmit detected data to a controller;
   a memory configured to store the detected data from the detector and to store a program code for controlling an operation of the automatic transmission controlled by the controller; and
   the controller configured to determine when an engine is cranked due to an increase in power required by a driver, and to determine when the engine is stopped due to a reduction in power required by the driver, in a case that a state of the HSG is a state in which the HSG does not operate; and then configured to crank the engine using a driving motor based on the detected data from the detector and to simultaneously control the independent flow control valve to supply an additional flow of the fluid to the engine clutch cooling channel by controlling the independent flow control valve.

* * * * *